United States Patent
Mattox et al.

(10) Patent No.: US 10,002,169 B2
(45) Date of Patent: *Jun. 19, 2018

(54) SEARCHING DATA BASED ON ENTITIES RELATED TO THE DATA

(71) Applicant: RED HAT, INC., Raleigh, NC (US)

(72) Inventors: John R. Mattox, Holly Springs, NC (US); Norman Lee Faus, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 25 days.

This patent is subject to a terminal disclaimer.

(21) Appl. No.: 15/050,073

(22) Filed: Feb. 22, 2016

(65) Prior Publication Data

US 2016/0171060 A1    Jun. 16, 2016

Related U.S. Application Data

(63) Continuation of application No. 12/040,815, filed on Feb. 29, 2008, now Pat. No. 9,268,841.

(51) Int. Cl.
*G06F 17/30* (2006.01)

(52) U.S. Cl.
CPC .. *G06F 17/30554* (2013.01); *G06F 17/30312* (2013.01); *G06F 17/30477* (2013.01); *G06F 17/30575* (2013.01); *G06F 17/30598* (2013.01); *G06F 17/30067* (2013.01)

(58) Field of Classification Search
None
See application file for complete search history.

(56) References Cited

U.S. PATENT DOCUMENTS

| | | | |
|---|---|---|---|
| 7,155,462 B1 | 12/2006 | Singh et al. | |
| 7,548,927 B2 | 6/2009 | Turner, Jr. et al. | |
| 7,685,109 B1* | 3/2010 | Ransil | G06F 17/30336 |
| | | | 707/999.003 |
| 7,817,790 B2 | 10/2010 | Sanmugasuntharam et al. | |
| 7,853,938 B2* | 12/2010 | Melhem | G06F 17/2247 |
| | | | 717/152 |
| 7,953,759 B2 | 5/2011 | Grossman et al. | |
| 8,406,389 B2 | 3/2013 | Mousseau et al. | |
| 8,655,876 B2 | 2/2014 | Mattox et al. | |
| 2002/0161733 A1 | 10/2002 | Grainger | |

(Continued)

OTHER PUBLICATIONS

USPTO, Notice of Allowance for U.S. Appl. No. 11/948,605, dated Oct. 11, 2013.

(Continued)

*Primary Examiner* — Hosain Alam
*Assistant Examiner* — Tuan-Khanh Phan
(74) *Attorney, Agent, or Firm* — Lowenstein Sandler LLP

(57) ABSTRACT

A processing device retrieves data from a plurality of applications and extracts identifying information about each of the plurality of application from the data. The processing device organizes the identifying information into a data structure based on entities associated with the data and stores the data structure in a searchable repository, wherein the identifying information is located in the data structure by searching the searchable repository for the entities associated with the data. In response to a request from one of the plurality of applications, the processing device retrieves stored information from the searchable repository.

17 Claims, 14 Drawing Sheets

(56) References Cited

U.S. PATENT DOCUMENTS

| | | |
|---|---|---|
| 2003/0004999 A1 | 1/2003 | Walker et al. |
| 2004/0010521 A1 | 1/2004 | Li et al. |
| 2004/0107212 A1 | 6/2004 | Friedrich et al. |
| 2004/0267792 A1 | 12/2004 | Kobayashi |
| 2005/0007249 A1 | 1/2005 | Eryurek et al. |
| 2005/0108262 A1 | 5/2005 | Fawcett et al. |
| 2005/0154760 A1 | 7/2005 | Bhakta et al. |
| 2005/0233735 A1 | 10/2005 | Karaoguz et al. |
| 2005/0273726 A1 | 12/2005 | Wyzga et al. |
| 2006/0004739 A1 | 1/2006 | Anthony et al. |
| 2006/0122973 A1 | 6/2006 | Berg et al. |
| 2007/0192289 A1* | 8/2007 | Lin ............... G06F 17/3087 |
| 2007/0201655 A1 | 8/2007 | Shenfield |
| 2007/0214179 A1 | 9/2007 | Hoang |
| 2009/0083336 A1 | 3/2009 | Srinivasan |
| 2009/0144236 A1 | 6/2009 | Mattox et al. |
| 2009/0222413 A1 | 9/2009 | Mattox et al. |
| 2009/0222414 A1 | 9/2009 | Mattox et al. |

OTHER PUBLICATIONS

USPTO, Office Action for U.S. Appl. No. 11/948,605, dated Mar. 29, 2010.
USPTO, Office Action for U.S. Appl. No. 11/948,605, dated Dec. 1, 2010.
USPTO, Office Action for U.S. Appl. No. 11/948,605, dated Aug. 14, 2012.
USPTO, Office Action for U.S. Appl. No. 11/948,605, dated Dec. 7, 2012.
USPTO, Office Action for U.S. Appl. No. 11/948,605, dated Jun. 25, 2013.
USPTO, Office Action for U.S. Appl. No. 12/040,770, dated Jun. 2, 2014.
USPTO, Office Action for U.S. Appl. No. 12/040,770, dated Jun. 18, 2015.
USPTO, Office Action for U.S. Appl. No. 12/040,770, dated Dec. 3, 2013.
USPTO, Office Action for U.S. Appl. No. 12/040,770, dated Jul. 12, 2010.
USPTO, Office Action for U.S. Appl. No. 12/040,770, dated Jan. 10, 2011.
USPTO, Office Action for U.S. Appl. No. 12/040,770, dated Feb. 28, 2012.
USPTO, Office Action for U.S. Appl. No. 12/040,770, dated Jul. 30, 2012.
USPTO, Advisory Action for U.S. Appl. No. 12/040,770, dated Oct. 11, 2012.
USPTO; Office Action for U.S. Appl. No. 12/040,852, dated Jan. 14, 2014.
USPTO; Office Action for U.S. Appl. No. 12/040,852, dated Nov. 17, 2014.
USPTO; Office Action for U.S. Appl. No. 12/040,852, dated May 19, 2015.
USPTO; Office Action for U.S. Appl. No. 12/040,852, dated Jul. 24, 2013.
USPTO; Office Action for U.S. Appl. No. 12/040,852, dated Jan. 14, 2011.
USPTO; Office Action for U.S. Appl. No. 12/040,852, dated Apr. 28, 2010.
USPTO; Office Action for U.S. Appl. No. 12/040,852, dated Dec. 23, 2010.
USPTO; Office Action for U.S. Appl. No. 12/040,852, dated May 25, 2011.
USPTO; Office Action for U.S. Appl. No. 12/040,852, dated Dec. 13, 2011.
USPTO; Advisory Action for U.S. Appl. No. 12/040,852, dated Feb. 21, 2012.
Ray et al., "Mac OS X Tiger Unleashed", ProQuest Tech Books, http://proquest.safaribooksonline.com/operating-systems/0672327465, published on Jun. 29, 2005, 9 pages, published by Sams.
Vignette, "Vignette Collaboration", <http://web.archive.org/web/20050306180913/a2000.g, May 2004, 31 pages, White Paper.

* cited by examiner

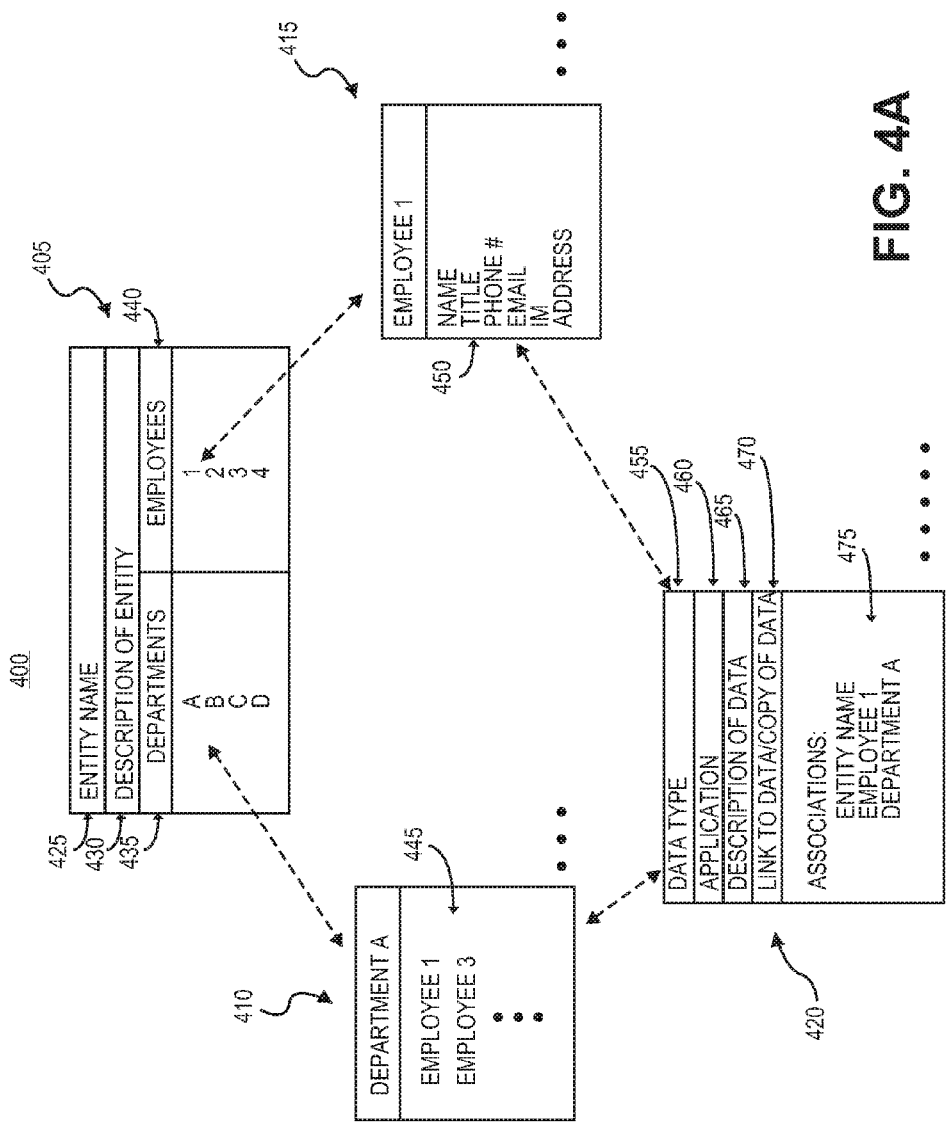

SEARCHING DATA BASED ON ENTITIES RELATED TO THE DATA

RELATED APPLICATIONS

This application is a continuation of U.S. patent application Ser. No. 12/040,815, filed Feb. 29, 2008, the entire contents of which are hereby incorporated by reference herein.

FIELD

This invention relates generally to data classification systems, more particularly, to methods and systems for providing information to a requester.

DESCRIPTION OF THE RELATED ART

The amount of data available to information seekers has grown astronomically, whether as the result of the proliferation of information sources on the Internet, or as a result of private efforts to organize business information within a company, or any of a variety of other causes. As the amount of available data grows, so does the need to be able to categorize or label that data so that the data may be more efficiently searched and a user may determine the relevance of data to them.

For businesses and organizations, data from different applications is typically grouped together based on the data's relation to a person or entity with which business is conducted, such as a client. For example, a business may arrange the data from different applications under a folder for a particular client. However, in order to view the different data, a user must view the data in each separate application in order to determine the nature and subject of the data. Accordingly, there is a need in the art for a mechanism to allow users to classify data from different applications in a way that uniformly allows a user to search and view the data.

BRIEF DESCRIPTION OF THE DRAWINGS

Various features of the embodiments can be more fully appreciated, as the same become better understood with reference to the following detailed description of an embodiment when considered in connection with the accompanying figures, in which:

FIGS. 4A-4C illustrates exemplary data structures in accordance with yet another embodiment.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of computing systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems and methods for classifying and organizing data from a variety of applications based on entities associated with the data. More particularly, a data classification module is configured to retrieve data from different applications. Each application can utilize data in a different format from other applications. The data classification module is configured to extract identifying information from the data, received from the applications. The identifying information includes information on entities and persons related to the data. For example, entities can be companies, corporations, associations, organization, and the like. Persons can be anyone related to the entities and the data such as employees of the entity.

The data classification module is configured to organize the identifying information into a data structure based on the entities associated with the data. After organization, the data classification module is configured to store the data structure in a searchable repository.

According to embodiments, data classification module is further configured to retrieve stored information from the repository. The data classification module is configured to receive a request to retrieve the stored information. The data classification module is configured to search the repository based on the request. Based on the search, the data classification module is configured to retrieve stored information from the repository. The data classification module is configured provide the retrieved information to a requester of the information. For example, the data classification module can be configured to provide the retrieved information in a series of interactive cascading menus.

By providing information from the repository, a user can view information and data from a variety of application without having to open the data in its native application. As such, the user can save time and effort in locating and viewing the information and data.

Figure 1:
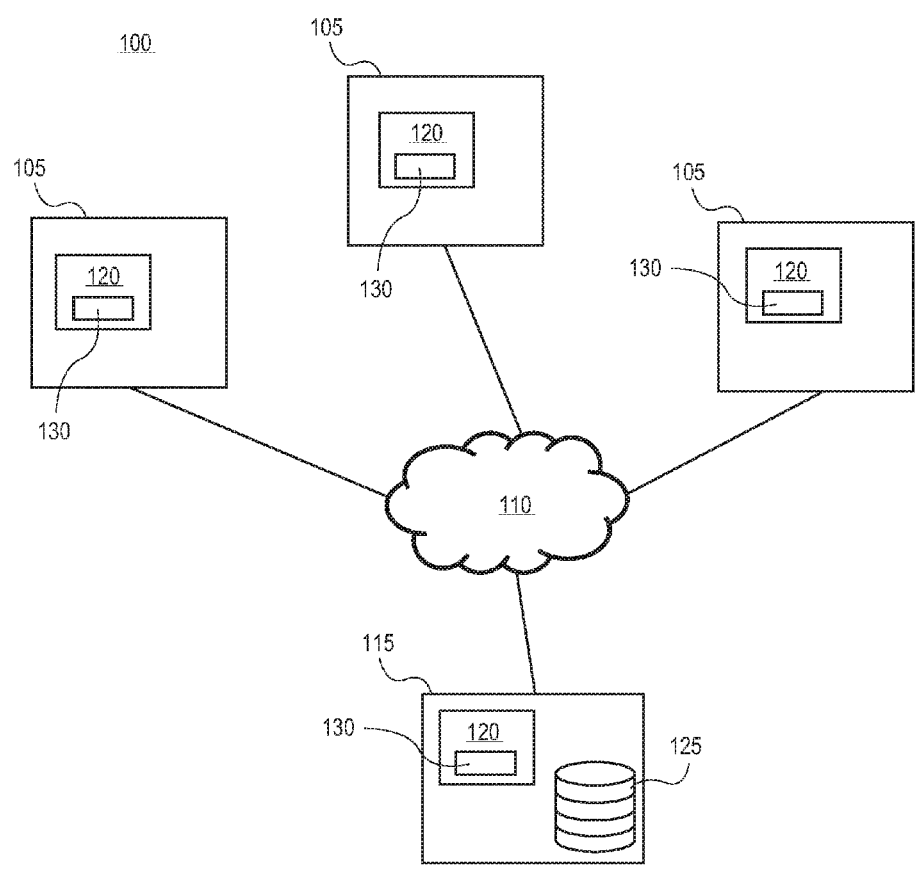
FIG. 1 illustrates an exemplary system in accordance with an embodiment.

FIG. 1 illustrates an exemplary system 100 in accordance with an embodiment. It should be readily apparent to those of ordinary skill in the art that system 100 depicted in FIG. 1 represents a generalized schematic illustration and that other components may be added or existing components may be removed or modified. Moreover, system 100 may be implemented using software components, hardware components, or combinations thereof.

As shown in FIG. 1, system 100 includes clients 105, a network 110 and a server 115. Client 105 is configured to provide users a platform for a software environment 120, such as described in FIG. 2. The users can be private individuals, employees of private business or public business or other persons interested in utilizing software environment 120 and accessing server 115. Client 105 can be implemented in personal computers, personal mobile devices, workstations or other networked computing platforms. While FIG. 1 illustrates three clients 105, those of ordinary skill in the art will realize that system 100 can include fewer or additional clients 105.

Network 110 can be a combination of wide area and local area networks such as the Internet. Network 110 can be configured to provide a communication channel between client 105 and server 115. Network 110 can implement a variety of network protocols to provide the communication channel such as Internet Protocol ("IP") Vx, ATM, SONET, or other similar network protocols.

Server 115 is configured to provide a variety or services and functions to client 105. Server 115 can be configured to provide application services, database services, website services, and the like. For example, server 115 can be configured to support software environment 120 and a database 125. Server 115 can be implemented in server computers, mainframes, workstations or other networked computing platforms. While FIG. 1 illustrates one server 115, those of ordinary skill in the art will realize that system 100 can include additional servers 115.

Software environment can include a data classification module 130. Data classification module 130 organizes identifying information into a data structure based on the entities associated with the data. After organization, data classification module 130 can be configured to store the data structure in a searchable repository, such as database 125. In particular, data classification module 130 stores the identifying information such that data from different applications 220 can be located by searching for an entity or person related to the data.

According to embodiments, data classification module 130 is further configured to retrieve stored information from the repository. Data classification module 130 is configured to receive a request to retrieve the stored information. Data classification module 130 is configured to search the repository based on the request. Based on the search, data classification module 130 is configured to retrieved stored information from the repository. Data classification module 130 is configured to provide the retrieved information to a requester of the information. For example, data classification module 130 can be configured to provide the retrieved information in a series of interactive cascading menus.

Figure 2:
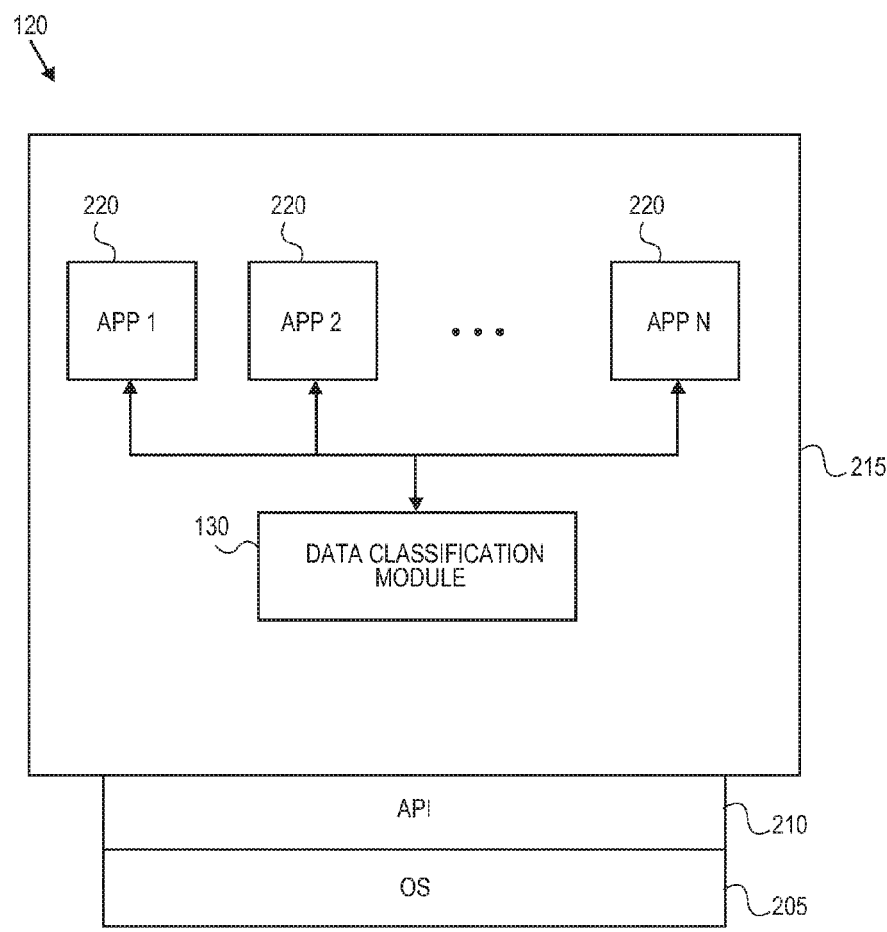
FIG. 2 illustrates an exemplary software environment in accordance with an embodiment.

FIG. 2 illustrates an exemplary software environment 120 in accordance with an embodiment. It should be readily apparent to those of ordinary skill in the art that software environment 120 depicted in FIG. 2 represents a generalized schematic illustration and that other components may be added or existing components may be removed or modified.

As shown in FIG. 2, software environment 120 can include an operating system 205. Operating system 205 can be a version of a Linux™, UNIX™, Windows™, or similar multi-tasking, multi-user operating system. A run-time environment (not shown) can be configured to execute on operating system 205. The run-time environment can provide a set of software that supports the execution of applications/programs. The run-time environment can also comprise an application program interface ("API") 210 and a complementary API (not shown) within an application space 215. API 210 can be configured to provide a set of routines that application space 215 uses to request lower-level services performed by operating system 205. Operating system 205 can include a kernel (not shown). The kernel can be configured to provide secure access to the underlying hardware of a processor.

Application space 215 can represent the space where a user can execute applications given the allotted memory space as determined by a system administrator of software environment 120. Within application space 215, a user can open and execute a number of applications 220. Applications 220 that can be executed within application space 215 can be a wide variety from databases, electronic mail, customer relationship management programs, utilities, browsers, multi-media application, word processing applications, spreadsheet applications, etc. Each of applications 220 has data objects, such as a native file and/or document format, that is associated with the respective application. For example, Microsoft Word™ has default document format, a Word document. Similarly, Adobe™ has a default document type, ".pdf" file, as another example.

Software environment 120 can further include a data classification module 130. Data classification module 130 can be configured to retrieve data from application 220. The data from each application 220 can be data objects that include any type of information (e.g., an email, email thread, forum, a website, a text file, an image or a Word document), each data object having a respective application 220 (browser, electronic mail, spreadsheet, content repository, etc.) The data object can also include abstract concepts such as events, projects, dates, places, and the like.

Data classification module 130 can be configured to extract identifying information from the data received from applications 220. The identifying information includes information on entities and persons related to the data. For example, entities can be companies, corporations, associations, organization, and the like. Person can be any one related to the entity or the data such as an employ of the entity.

Data classification module 130 organizes the identifying information into a data structure based on the entities associated with the data. After organization, data classification module 130 can be configured to store the data structure in a searchable repository, such as database 125. In particular, data classification module 130 stores the identifying information such that data from different applications 220 can be located by searching for an entity or person related to the data.

According to embodiments, data classification module 130 is further configured to retrieve stored information from the repository. Data classification module 130 is configured to receive a request to retrieve the stored information. Data classification module 130 is configured to search the repository based on the request. Based on the search, data classification module 130 is configured to retrieved stored information from the repository. Data classification module 130 is configured provide the retrieved information to a requester of the information. For example, data classification module 130 can be configured to provide the retrieved information in a series of interactive cascading menus.

Figure 3:
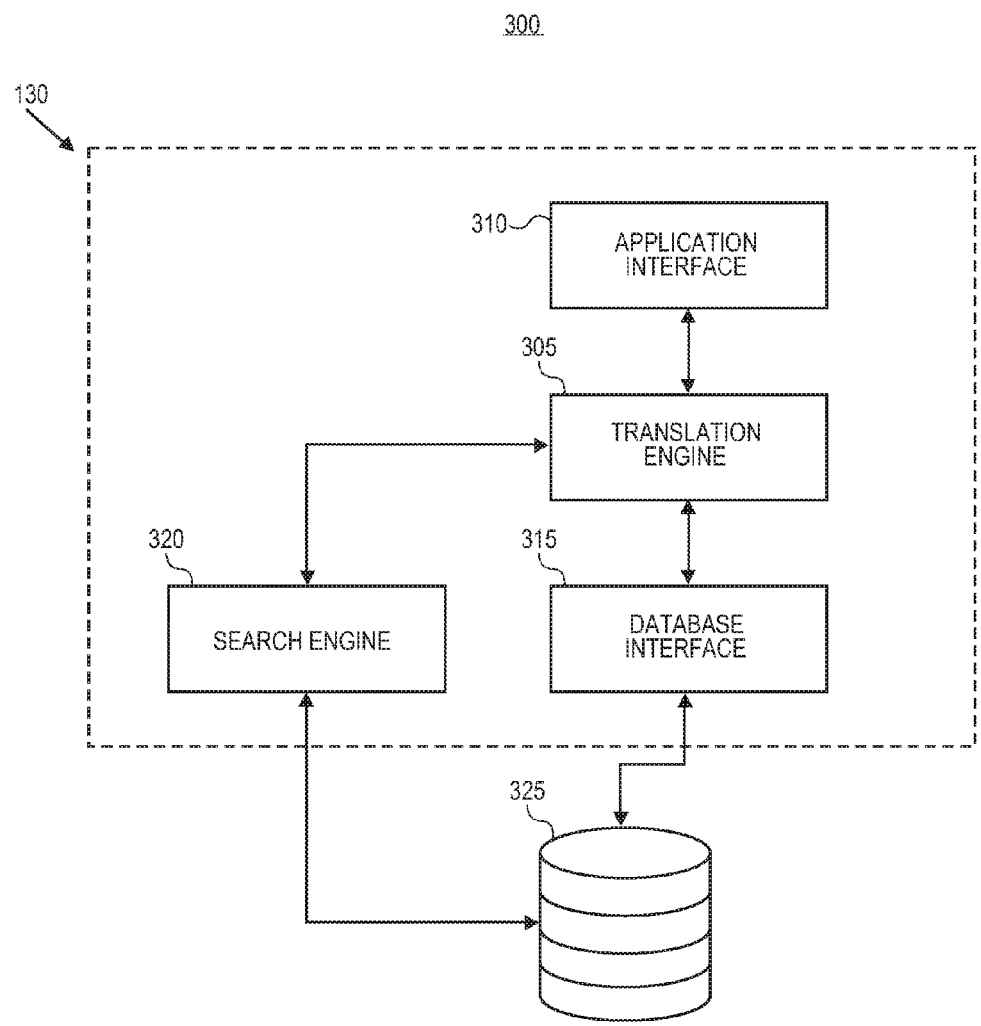
FIG. 3 illustrates an exemplary data classification module in accordance with another embodiment.

FIG. 3 depicts a more detailed block diagram 300 of data classification module 130 in accordance with another embodiment. It should be readily apparent to those of ordinary skill in the art that the diagram depicted in FIG. 3 represents a generalized schematic illustration and that other components may be added or existing components may be removed or modified.

As shown in FIG. 3, data classification module 130 can comprise a translation engine 305, an application interface 310, a database interface 315, and a search engine 320. Modules 305-320 of data classification module 130 can be implemented as software components, hardware components or combinations thereof. More particularly, modules 305-320 can be implemented using conventional programming languages (e.g., Pascal, FORTRAN, etc.), objected oriented programming languages (e.g., C++), Java, PHP, Perl, XML or other similar languages. Modules 305-320 can also be implemented as hardware components such as an application specific integrated circuit, a programmable read-only memory, an EEPROM, a microcontroller, a microprocessor or other similar computing platform.

Data classification module 130 can be coupled to a database 325. Database 325 can be implemented utilizing any type of conventional database architecture using open source technologies, proprietary technologies, or combinations thereof.

Translation engine 305 can be configured to manage modules 310-320 to provide the functionality of data classification module 130 as previously described and further described herein below. In particular, translation engine 305 is configured to receive data from different applications 220. The data received from the different applications can be in it respective native or default data format. For example, data received from an email application can be in the format for an email message or email thread. In another example, data received from a word processing application can be in the format of a word processing file.

In order to receive data from applications 220, translation engine 305 can be coupled to application interface 310. Application interface 310 can be configured to interface to different applications, such as applications 220, in order to retrieve data from the applications. Application interface 310 can be configured to retrieve data from applications 220 each time new data is entered into or created in application 220.

Likewise, application interface 310 can be configured to retrieve data from application 220 in response from a request from a user of software environment 120. For example, a menu icon that is linked to application interface 310 can be configured to be installed with applications 220. In some instances, applications 220 can be open source applications, which allow these configuration/installation modifications. If applications 220 are proprietary applications, i.e., not open source, applications 220 can permit the same configuration/installation modification depending on their published application program interfaces. When the menu icon is activated, application interface 310 can retrieve data from the activating application.

Translation engine 305 is configured to extract identifying information from the data received from applications 220. The identifying information can be the type of application the data was retrieved from, the subject of the data, a reference to the data, an entity associated with the data, and a person related to the entity and associated with the data and the like.

In order to extract identifying information from the application data, translation engine 305 can include rules for extracting identifying information from data received from each application 220. In particular, for each application 220, translation engine 305 can include a rule that sets forth the identifying information for data received from that application. For example, for data received from an email application, the rule can be that the identifying information includes the type email application, all recipients and senders of the email, and the subject of the email.

Translation engine 305 can extract the identifying information from the data itself or from meta data. For example, most data generated by applications include meta data. The meta data typically describes the property of the data such as application type, description of the data, creator of the data, and the like. Translation engine 305 can include a list of meta data included in data from different applications 220. Translation engine 305 can utilize the list in order to identify meta data in received data from applications 220.

The rules can further include how to extract the identifying information from the data. For example, for an email application, the rule can define that the type of application can be extracted from the meta data, the recipients and senders can be extracted from the "to," "from," and "cc" fields, and the description can be extracted from the "subject" field. As such, translation engine 305 can parse the data from application 220 in order to extract the identifying information.

After extracting the identifying information, data classification module 130 organizes the identifying information into a searchable data structure. To achieve this, translation engine 305 can be coupled to a database interface 315. Database interface 315 can organize the identifying information into a searchable data structure based on entities and persons associated with the entity. Database interface 315 can then store the organized identifying information in a searchable repository such as database 325.

Database interface 315 utilizes a hierarchical relational structure 400 based on an entity and person associated with the entity to organize the identifying information. FIG. 4A illustrates an example of the structure employed by database interface 315. It should be readily apparent to those of ordinary skill in the art that the diagram depicted in FIG. 4A represents a generalized schematic illustration and that other components may be added or existing components may be removed or modified.

As illustrated in FIG. 4A, structure 400 includes records for entities, person related to the entity, and data related to the entity. Structure 400 can include an entity record 405, a department record 410, employee record 415, and data record 420.

Entity record 405 includes fields that identify and describe an entity. For example, entity record 405 can include an entity name field 425, a description field 430, a department field 435, and employees field 440. Entity name field 425 can be filled with information that identifies the entity such as the legal name of the entity. Description field 430 can be filled with information that describes the entity such as the address, phone number, and business type. Department field 435 can be filled with the various department or sections of the entity. Employee field 440 can be filled with the various employees of the entity. Although FIG. 4A illustrates only one entity record 405, it should be readily apparent to those of ordinary skill in the art that structure 400 can include any number of entity records 405 for each entity.

Department record 410 can include an employee field 445. Employee field 405 can be filled with employees of the entity that belong to the particular department. Although FIG. 4A illustrates only one department record 410, it should be readily apparent to those of ordinary skill in the art that structure 400 can include any number of department records 410 for each department of the entity.

Employee record 415 can include an employee information field 450. Employee information field 450 can be filled with details of the employee such as name, title, phone number, email address, instant message "IM" handle, physical address, and the like. Although FIG. 4A illustrates only one employee record 415, it should be readily apparent to those of ordinary skill in the art that structure 400 can include any number of employee records 415 for each employee of the entity.

Data record 420 can include information that identifies data received from applications. Data record 420 can include a data type field 455, an application type field 460, a description field 465, reference field 470, and associations field 475. Data type field 455 can be filled with information that describes the type of data the record identifies, such as email message, word processing file, invoice, and the like.

Application type field 460 can be filled with information that identifies the application associated with the data, such as email application, word processing application, financial application, and the like. Reference field 470 can be filled with a information identifying a storage location of the data such as a link to the data. Associations field 475 can be filled with information identifying employees, departments, and entities associated with the data. Although FIG. 4A illustrates only one data record 420, it should be readily apparent to those of ordinary skill in the art that structure 400 can include any number of data records 420 for each data item received from an application.

Structure 400 illustrated in FIG. 4A shows the relation of the identifying information for received data to a particular entity. Database interface 315 can also be configured to generate a data structure that references all entities and all persons associated with the entities. This data structure can be utilized during searching.

Figure 4B:
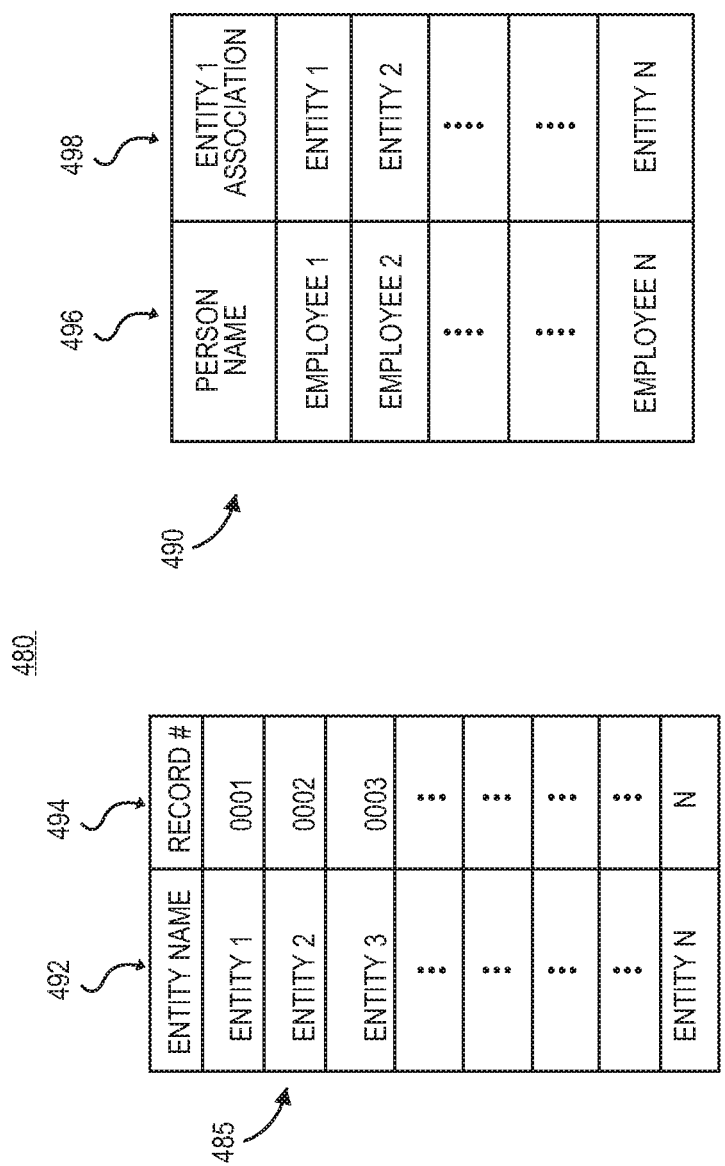

FIG. 4B show an exemplary structure 480 that references all entities and persons. It should be readily apparent to those of ordinary skill in the art that the diagram depicted in FIG. 4B represents a generalized schematic illustration and that other components may be added or existing components may be removed or modified.

As illustrated in FIG. 4B, structure 480 can include entity listing record 485 and persons listing record 490. Structure 480 can aid with searching by allowing data classification module 130 to search by the name of an entity or a person and locate records associated with the entity or person.

Entity listing record 485 can include an entity name fields 492 and record number fields 494. Entity name fields 492 can be filled with the names of entities for which records 405 exist. Record number fields 494 can be filled with an identifier, such as record number, that identifies the record associated with each entity name.

Persons listing record 490 can include person name fields 496 and entity association fields 498. Person name fields 496 can be filled with the names of persons, such as employees of the entities, that have been identified in structure 400. Entity association fields 498 can be filed with an entity with which the named persons are associated.

Prior to storing information in data structure 400, record entry 405 in the hierarchy must be generated for different entities. Record entry 405 for each entity can be generated by designating one application 220 as a master application. Typically, this master application would have all the data required for record 405. For example, a financial application can be designated as the master application. Since the financial application typically includes information about all entities, the financial application would include most information in record 405.

Each time the master application receives information about a new entity from a user, a new record 405 can be created for the new entity. The new record 405 can be populated with the data entered in the master application.

Figure 5:
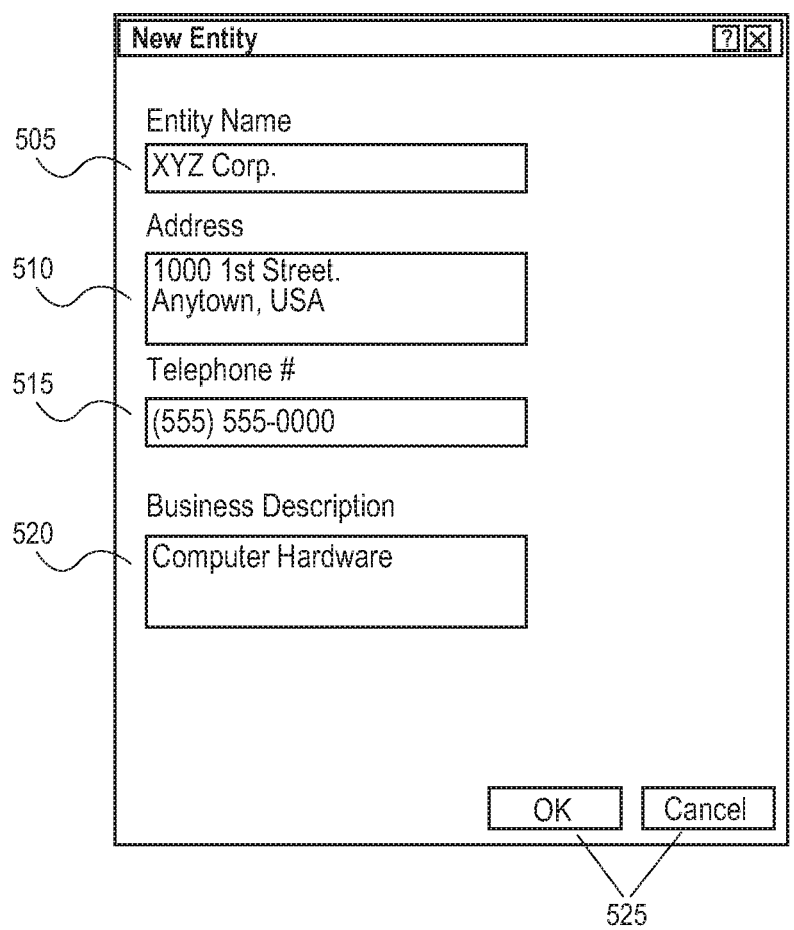
FIG. 5 illustrates an exemplary interface in accordance with yet another embodiment.

In addition to designating a master application, application interface can be configured to generate a graphical user interface, ("GUI") such as dialog boxes, web pages and the like in order to create a new record 405. The GUI can include field for entering information about the new entity such as name of the entity, address, telephone number, contact person, and the like. FIG. 5 illustrates an exemplary GUI 500 for creating a new record 405. It should be readily apparent to those of ordinary skill in the art that the diagram 500 depicted in FIG. 5 represents a generalized schematic illustration and that other components may be added or existing components can be removed or modified.

As illustrated, GUI 500 can includes an entity name text field 505, an address text field 510, telephone number text field 515, a business description text field 520, and confirmation buttons 525. A user can enter the identity of the entity in text field 505, the address of the entity in text field 510, the telephone number of the entity in text field 515, and description of the entity in text field 520.

Once the user has entered the information in text fields 505-520, the user can transmit the identifying information to data classification module 130 by selecting the "OK" button of confirmation buttons 525. The user can also cancel the request by selecting the "Cancel" button of the confirmation buttons 525.

Figure 4C:
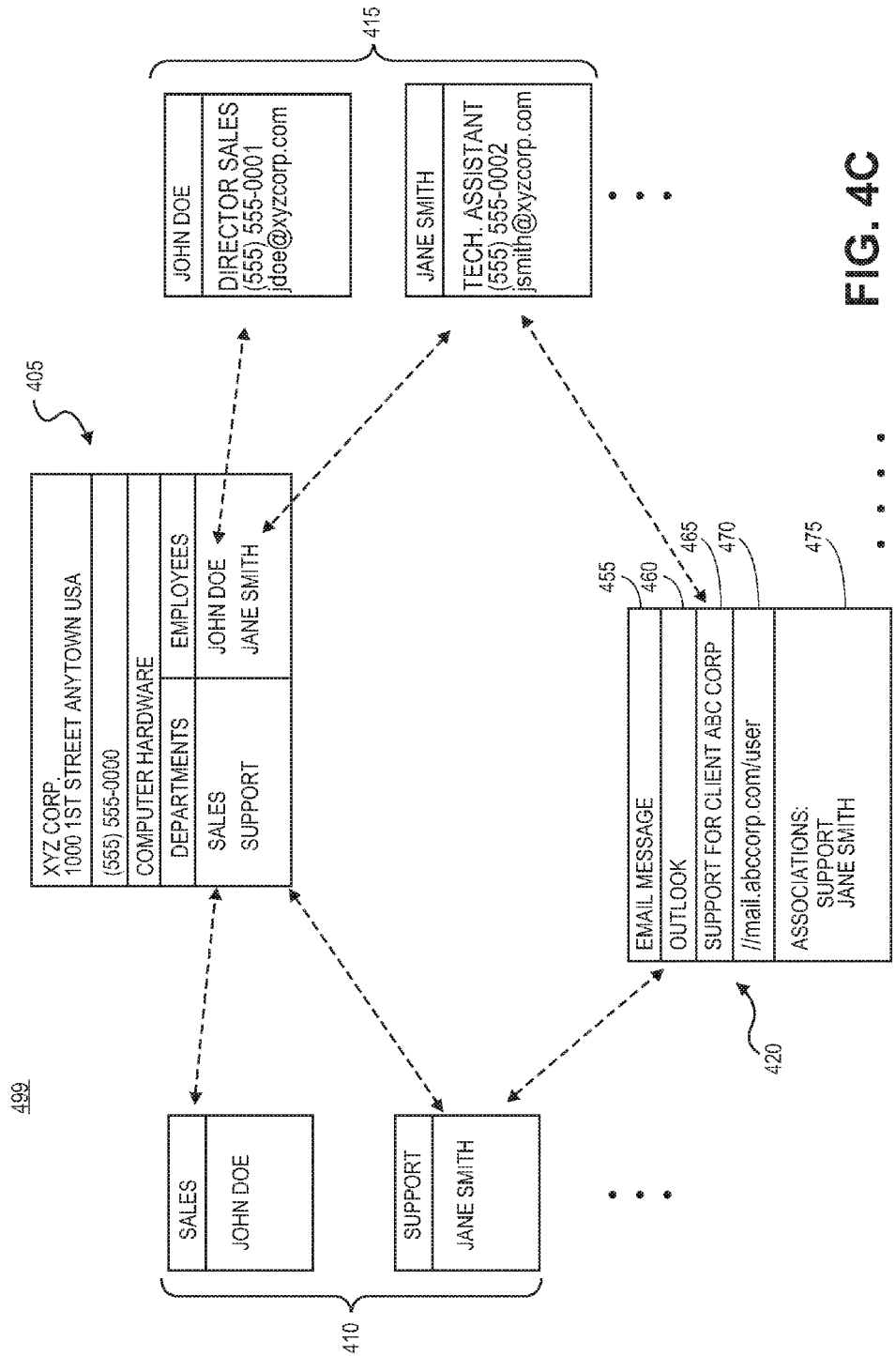

After a record 405 has been created, data classification module 130 can begin receiving data associated with the entity identified in record 405. FIG. 4C illustrates an exemplary structure 499 in which the records 405-420 have been filled with identifying information.

As illustrated, entity record 405 can be created and filled with information for an entity named "XYZ Corp." Entity record 405 can be created an filled by a master application or by a GUI such as GUI 500. Also, department records 410 and employees records 415 can be created and filled with information for the entity "XYZ Corp." Department records 410 and employees records 415 can be created an filled by the master application or by a GUI such as GUI 500.

Also, as illustrated in FIG. 4C, record 420 can created and can be filled with data from an email application such as Outlook. For example, a user of another entity "ABC corp" can be operating an application 220, such as Outlook. Application 220 can receive an email from "Jane Smith" at "XYZ Corp" with the subject "Support for client ABC Corp." The email can be regarding a technical support issue at "ABC Corp" that "XYZ Corp" is servicing. Once application 220 receives the email, a request can automatically be sent to data classification engine 130 to retrieve the email and classify the email. Likewise, the request can be initiated by the user.

After receiving the request, translation engine 305 can extract the identifying information from the email in order to fill record 420. For example, translation engine 305 can extract, from the email, the type of email program from the meta data; the sender of the email, "Jane Smith," from the sender's email address; the entity, "XYZ Corp," associated with the sender from the senders email address; and a storage location, "//mail.xyzcorp.com/user," from the meta data.

After extracting the identifying information, database interface 315 can create record 420 and fill record 420 with the extracted information. For example, data type field 455 can be filled "email message"; application type field 460 can be filled "Outlook," the email application receiving the email; reference field 470 can be filled "//mail.abccorp.com/user," the mail server for "ABC Corp" where the email is stored; and associations field 475 can be filled with "Jane Smith" and "Support". Database interface 315 can then store record 420 in database 325 linked to records 405, 410, and 415.

Returning to FIG. 3, data classification module 130 can include a search engine 320. Search engine 320 can be an independent module 320 or be part of database 325 in some embodiments. Search engine 320 can be configured to receive a query from translation engine 305 that includes search topics related to any fields and records included in data structures stored in database 325, such as data structures 400 and 480 illustrated in FIGS. 4A and 4B. Search engine 220 can then be configured to search repository 215 for entries which may include the search topics and return the results to translation engine 305.

Applications 220 can be modified in order to allow user of application 220 to submit requests to search database 325 and return the results. For example, a menu icon that is linked to application interface 310 can be configured to be installed with applications 220. Additionally, an input action associated with applications 220 can be configured to initiate the request. For example, applications 220 can be configured to initiate the request in response to a user "right-clicking" a element of application 220.

According to embodiments, data classification 130 can be configured to initiate a search of the entity classified data structures based on a request from applications 220. More particularly, application interface 310 can be configured to receive a request from applications 220. After receipt of the request, translation engine 305 can pass the request to search engine 320.

Search engine 320 can be configured to receive the request from translation engine 305. The request can include search topics related to any fields and records included in data structures stored in database 325, such as data structures 400 and 480 illustrated in FIGS. 4A and 4B. Search engine 220 can then be configured to search repository 215 for entries which may include the search topics and return the results to translation engine 305.

Translation engine 305 can pass the results to application interface 310. Application interface 310 can be configured to return the results to requesting application 220. Application interface 310 can be configured to generate an interface, such as a GUI, to return the results to requesting application 220. As such, the user of requesting application 220 can view the results.

Figure 6A:
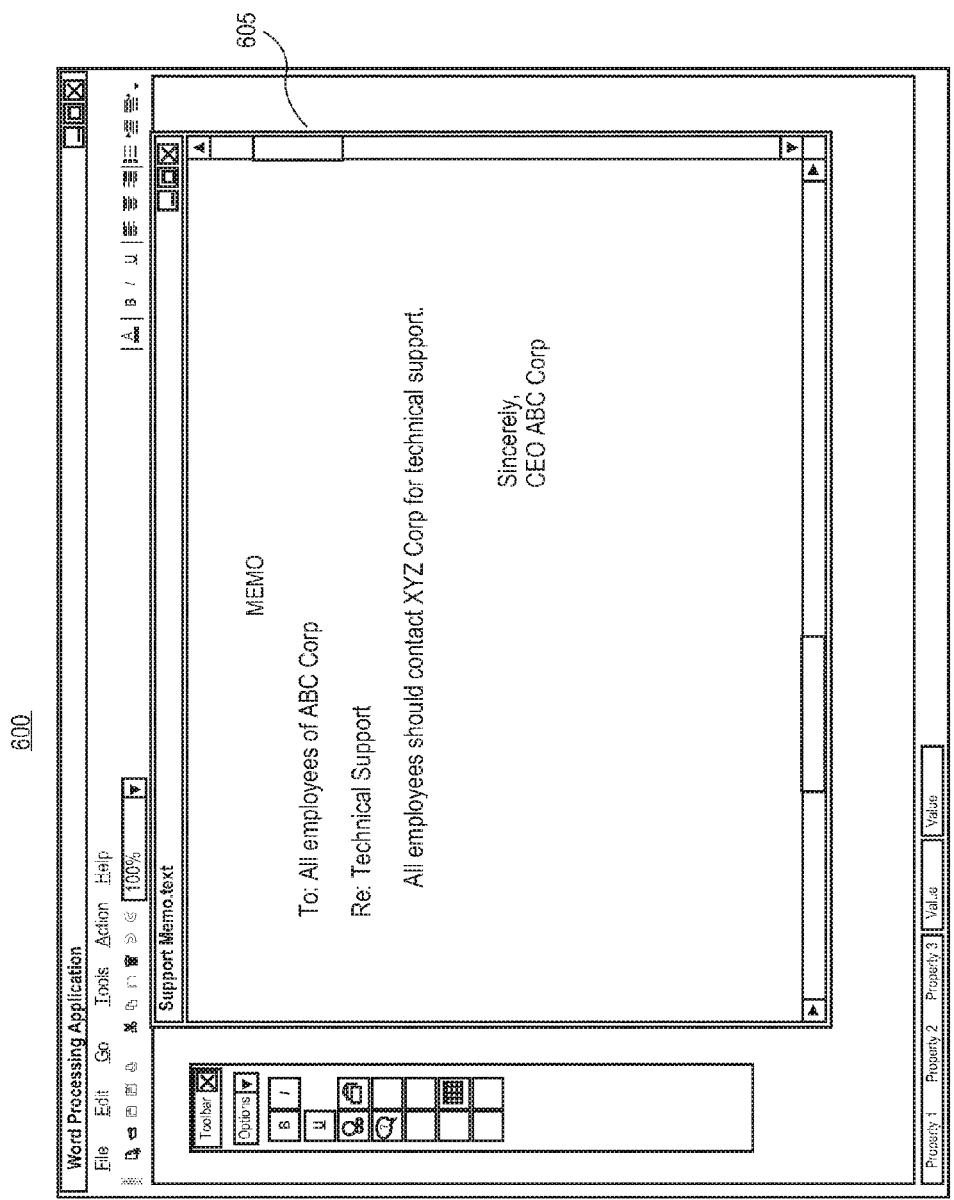
FIGS. 6A-6E illustrate an exemplary interface for displaying retrieve information in accordance with yet another embodiment.
Figure 6B:
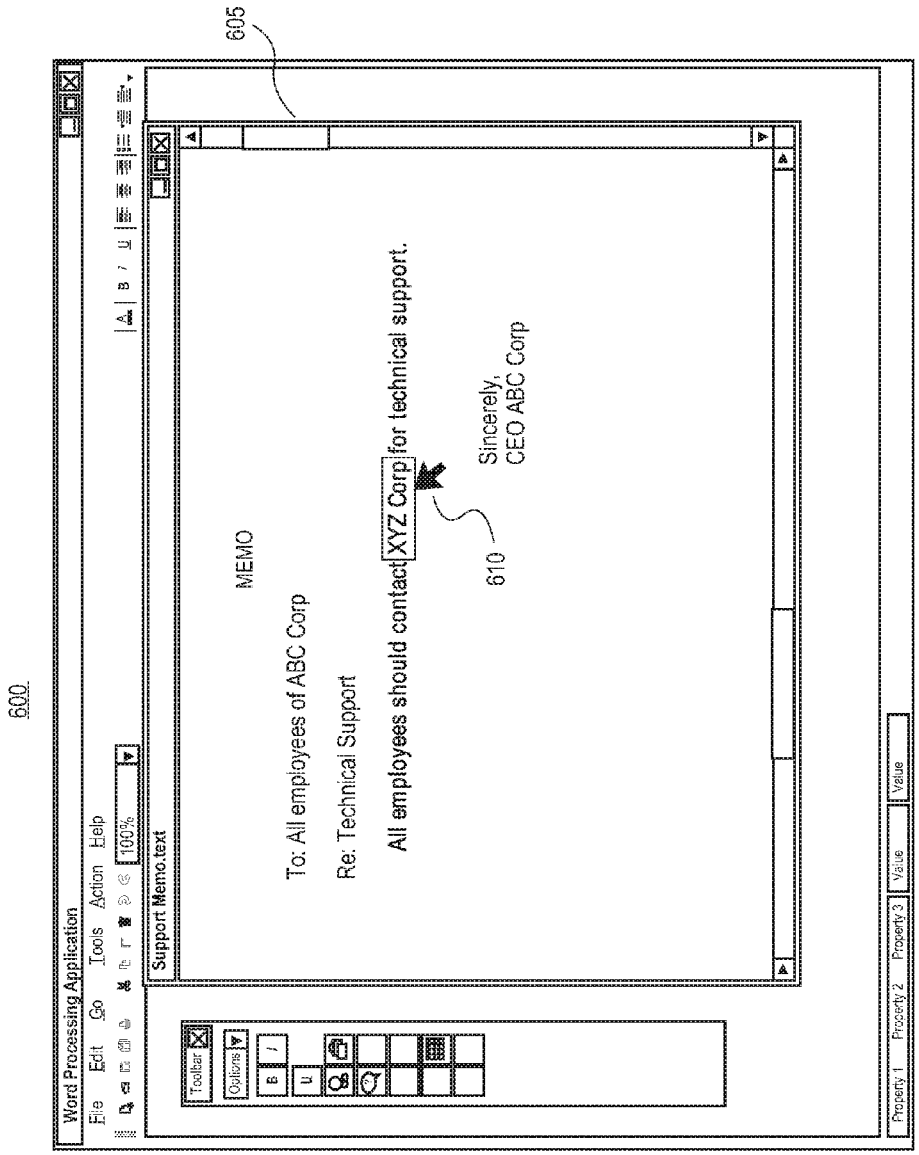
Figure 6C:
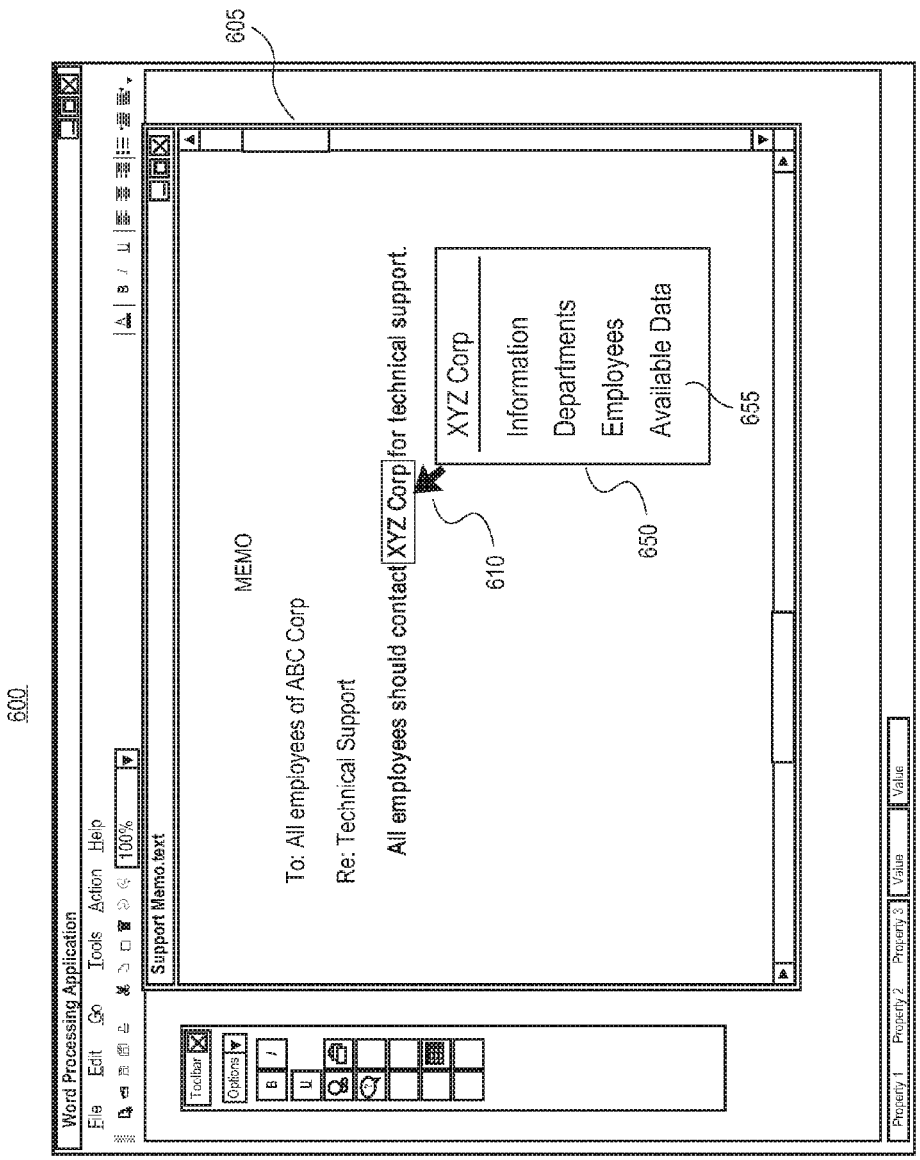

Application interface 310 can generate the interface to display the result in any format to convey the results to the user. For example, application interface 310 can generate an interface that displays the results in a series of cascading menus. FIGS. 6A-6C show exemplary interfaces generated by application interface 310 to display the results of a search.

As illustrated in FIG. 6A, a user, such as an employee of "ABC Corp", can be viewing a word processing document 605 in a word processing program 600. Word processing document 605 can be a memo about acquiring technical support from "XYZ Corp". According to embodiments, the user can acquire additional information about "XYZ CORP" by requesting that a search be perform by data classification module 130.

FIG. 6B shows one process to request a request a search by data classification module 130. As illustrated, to initiate a search, the user can highlight the text term "XYZ Corp" with a pointer 610 in word processing document and perform a "right click" action. The "right click" action would initiate word processing application 600 to send a request to data classification module 130 to search database 325.

For example, based on the term "XYZ Corp", search engine 320 can search database 325 and locate record 405 in data structure 480. Search engine 320 can locate data structure 400 by first searching record 485 to find the record identification for the term "XYZ Corp". Search engine 320 can then retrieve record 480 and records 410, 415, and 420 associated with record 480. Search engine 320 can then pass the records to application interface 310.

After receipt of the records, application interface 310 can generate an GUI to display the retrieved records. Application interface 310 can then provide the GUI to word processing application 600.

FIG. 6C shows an example of a GUI 650 generated by application interface 310. It should be readily apparent to those of ordinary skill in the art that the diagram depicted in FIG. 6C represents a generalized schematic illustration and that other components may be added or existing components may be removed or modified.

As illustrated, application interface 310 can be configured to generate GUI 650 to includes a series of cascading menus to display the information from records 405, 410, 415, and 420. Specifically, top menu 655 in the series of cascading menus can contain broad information categories such as "Information, Departments, Employees, Available Data". The categories can be based on the different records 405, 410, 415, and 420. In order to view additional data, the user can move pointer 610 over one of the categories and sub-menus will appear displaying more specific data.

Figure 6D:
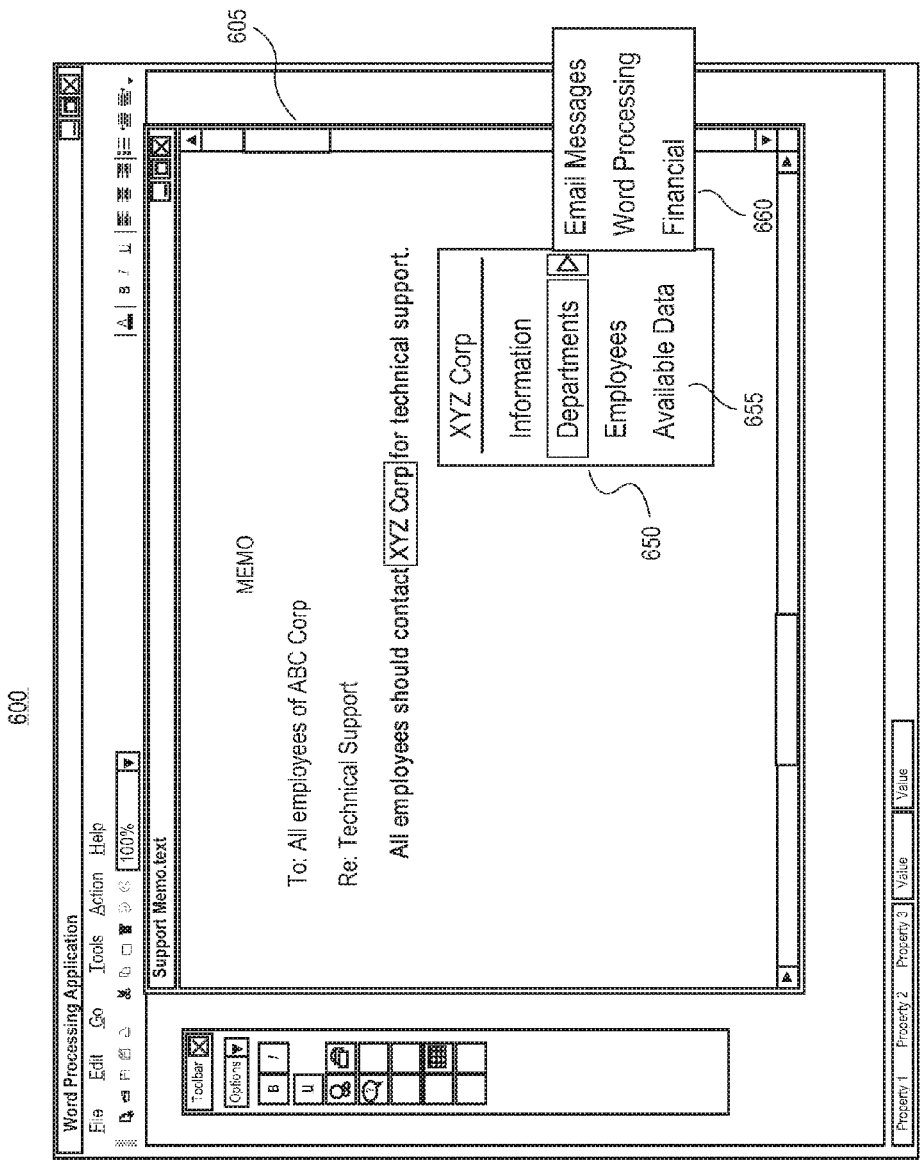

FIG. 6D shows an example of sub-menus in GUI 650 in the series of cascading menus. As illustrated, when the user moves the pointer over category "Departments", word processing application 600 displays a sub-menu 660. Sub-menu 660 can include several sub-categories to allow the user to view more specific data. Sub-menu 660 can include data from record 410. In order to view additional data, the user can move pointer 610 over the sub-categories and additional sub-menus will appear displaying more specific data.

Figure 6E:
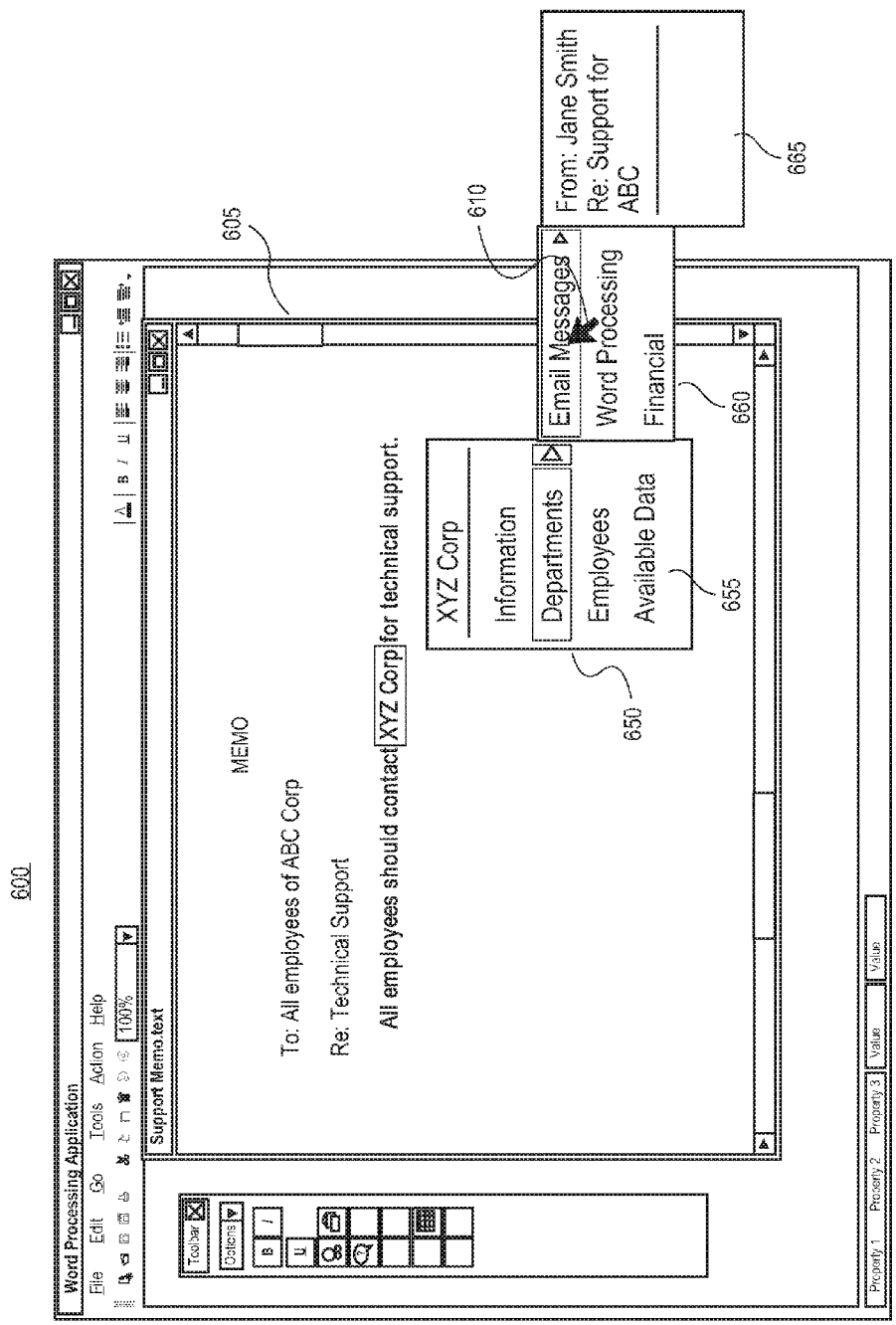

FIG. 6E shows an example of additional sub-menus in GUI 650. As illustrated, when the user moves the pointer over category "Email Messages", word processing application 600 displays a sub-menu 665. Sub-menu 665 can include several sub-categories to allow the user to view more specific data about previous stored email messages. Sub-menu 665 can include data from record 420. For example, sub-menu 665 can include the sender of the email message from record 420 and the subject of the message.

Additionally, the user can move pointer 610 over sub-menu 665 and "left-click" on the sub-category to active a link to the email message. By activating the link, an email application 220 can be activated and the email message can be viewed.

To achieve this, once the user "left-clicks" on the sub-category, application 605 can be configured to transmit a request to initiate a different application to data classification module 130. The initiation request can include the data desired to be viewed in the different application. Data classification module 130 can be configured to forward the information to the appropriate application for initiation and viewing.

Figure 7:
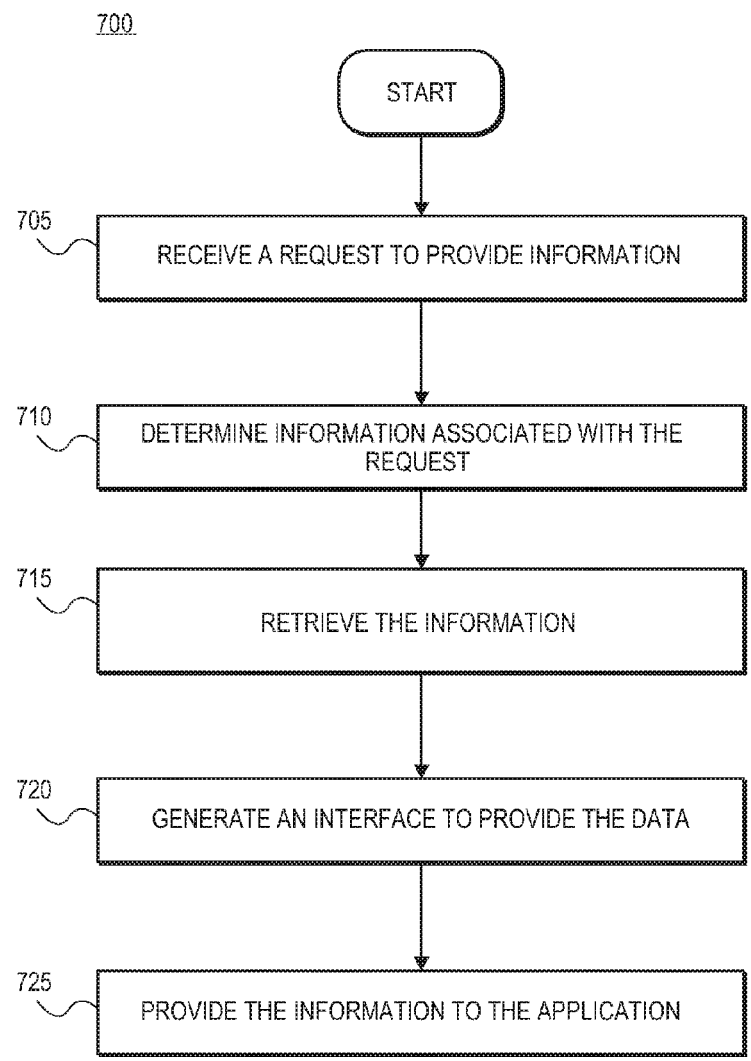
FIG. 7 illustrates an exemplary process flow of a data classification module in accordance with another embodiment.

FIG. 7 depicts an exemplary data classification flow diagram 700 implemented by data classification module 130 in accordance with another embodiment. It should be readily apparent to those of ordinary skill in the art that the flow diagram 700 depicted in FIG. 7 represents a generalized schematic illustration and that other steps may be added or existing steps may be removed or modified.

As shown in FIG. 7, data classification module 130 can be configured to receive a request from an application 220 to provide information, in step 705. The identifying information can be the type of application the data was retrieved from, the subject of the data, a reference to the data, an entity associated with the data, a person related to the entity and associated with the data or the like.

Then, data classification module 130 determines the information based on the request, in step 710. Specifically, translation engine 305 is configured to direct search engine 320 to search database 325 based on the request.

After determining the information, data classification module 130 retrieves the information from the database, in step 715. Specifically, translation engine 305 can direct database interface 315 to retrieve the information from database 325.

Then, data classification module 130 generates an interface to provide the data to the requester, in step 720. Specifically, translation engine 305 can provide the retrieved information to application interface 310. Application interface 310 can generate an interface to display the information to the requester. The interface can be a series of cascading menus that allow the requester to selectively view the retrieved information. After generating the interface, data classification module 130 provides the interface to the requesting application, in step 725.

Figure 8:
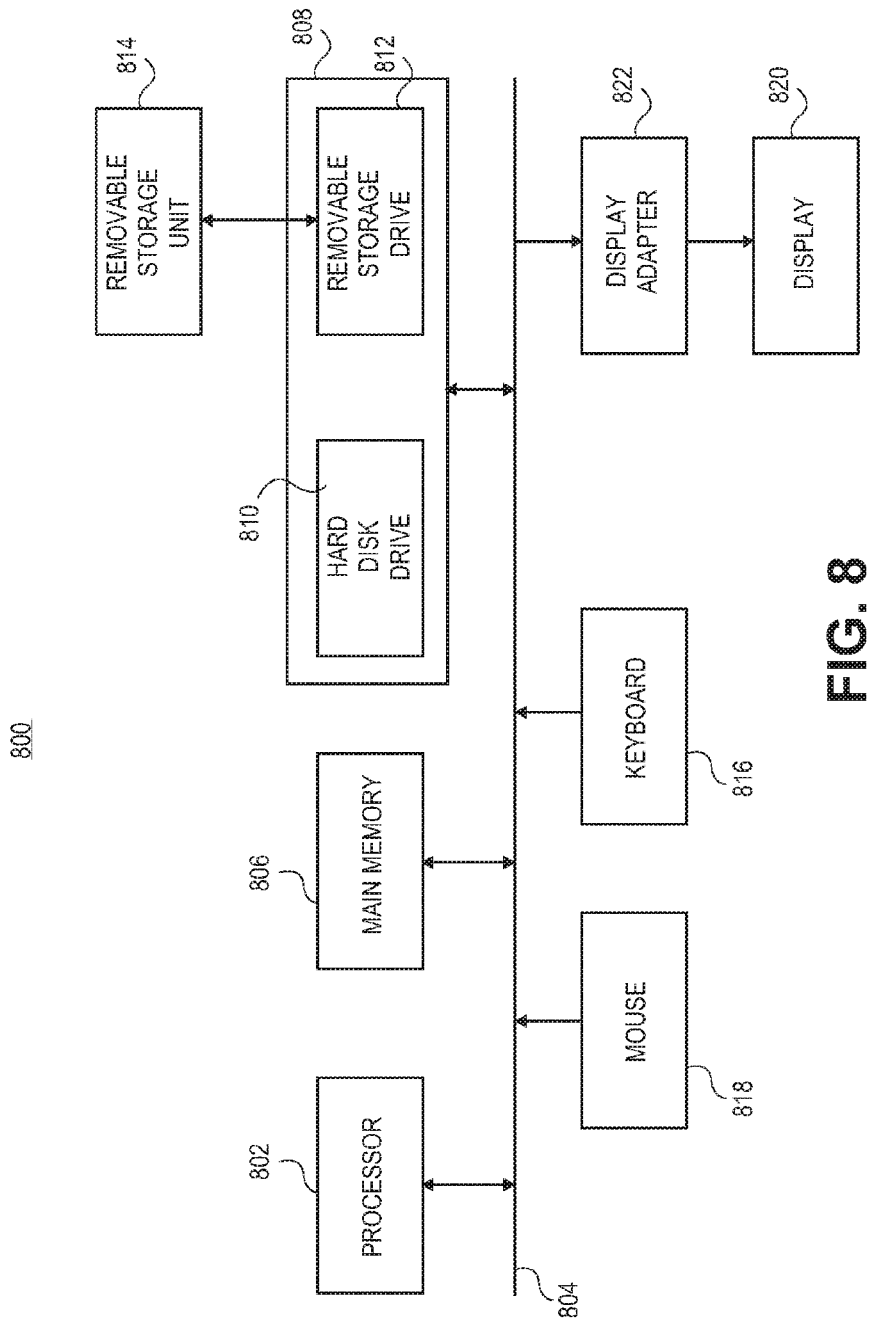
FIG. 8 illustrates an exemplary computer platform in accordance with another embodiment.

FIG. 8 illustrates an exemplary block diagram of a computing platform 800 where an embodiment may be practiced. The functions of the data classification module 130 can be implemented in program code and executed by computing platform 800. Data classification module 130 can be implemented in computer languages such as PASCAL, C, C++, JAVA, etc.

As shown in FIG. 8, computing platform 800 includes one or more processors, such as processor 802 that provide an execution platform for embodiments of data classification module 130. Commands and data from processor 802 are communicated over a communication bus 804. Computing platform 800 also includes a main memory 806, such as a Random Access Memory (RAM), where data classification module 130 can be executed during runtime, and a secondary memory 808. Secondary memory 808 includes, for example, a hard disk drive 810 and/or a removable storage drive 812, representing a floppy diskette drive, a magnetic tape drive, a compact disk drive, etc., where a copy of a computer program embodiment for data classification module 130 can be stored. Removable storage drive 812 reads from and/or writes to a removable storage unit 814 in a well-known manner. A user interfaces with the data classification module 130 with a keyboard 816, a mouse 818, and a display 820. Display adapter 822 interfaces with the communication bus 804 and display 820. Display adapter 822 also receives display data from processor 802 and converts the display data into display commands for display 820.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
    retrieving data from a plurality of applications running on a client device, the data comprising data objects generated by the plurality of applications;
    extracting identifying information about each of the plurality of applications from the data, the identifying information comprising entities associated with the data;
    organizing, by a processor, the identifying information into a data structure in view of the entities associated with the data;
    storing, by the processor, the data structure in a searchable repository, wherein the identifying information is located in the data structure by searching the searchable repository for the entities associated with the data;
    retrieving stored information from the searchable repository in response to a request from one of the plurality of applications;
    generating an interface to present the stored information, the interface comprising a first interface element to present first identifying information from a first record and a second interface element to present second identifying information from a second record; and
    providing the interface to the one of the plurality of applications for display on a display device, wherein the second interface element to cascade from the first interface element to present the second identifying information in response to an interaction with the first interface element.

2. The method of claim 1, wherein the plurality of applications comprises at least one of a database application, an electronic mail application, a customer relationship management application, a computer system utility application, a browser application, a multi-media application, a word processing application, or a spreadsheet application.

3. The method of claim 1, wherein the identifying information comprises at least one of a type of application from which the data was retrieved, a subject of the data, a reference to the data, an entity associated with the data, or a person associated with the entity.

4. The method of claim 1, wherein extracting the identifying information comprises applying an extraction rule corresponding to a type of application from which the data was retrieved.

5. The method of claim 1, wherein the data structure comprises a hierarchical data structure of entries, each entry comprising a corresponding entity, a stored person related to the corresponding entity, and stored data related to the corresponding entity.

6. The method of claim 1, wherein the request is issued by one of the plurality of applications in response to received user input initiating the request.

7. An apparatus comprising:
a memory; and
a processor, operatively coupled to the memory, to:
retrieve data from a plurality of applications running on a client device, the data comprising data objects generated by the plurality of applications;
extract identifying information about each of the plurality of applications from the data, the identifying information comprising entities associated with the data;
organize the identifying information into a data structure in view of the entities associated with the data;
store the data structure in a searchable repository, wherein the identifying information is located in the data structure by searching the searchable repository for the entities associated with the data;
retrieve stored information from the searchable repository in response to a request from one of the plurality of applications;
generate an interface to present the stored information, the interface comprising a first interface element to present first identifying information from a first record and a second interface element to present second identifying information from a second record; and
provide the interface to the one of the plurality of applications for display on a display device, wherein the second interface element to cascade from the first interface element to present the second identifying information in response to an interaction with the first interface element.

8. The apparatus of claim 7, wherein the plurality of applications comprises at least one of a database application, an electronic mail application, a customer relationship management application, a computer system utility application, a browser application, a multi-media application, a word processing application, or a spreadsheet application.

9. The apparatus of claim 7, wherein the identifying information comprises at least one of a type of application from which the data was retrieved, a subject of the data, a reference to the data, an entity associated with the data, or a person associated with the entity.

10. The apparatus of claim 7, wherein to extract the identifying information, the processor to apply an extraction rule corresponding to a type of application from which the data was retrieved.

11. The apparatus of claim 7, wherein the data structure comprises a hierarchical data structure of entries, each entry comprising a corresponding entity, a stored person related to the corresponding entity, and stored data related to the corresponding entity.

12. The apparatus of claim 7, wherein the request is issued by one of the plurality of applications in response to received user input initiating the request.

13. A non-transitory computer readable storage medium storing instructions that, when executed by a processor, cause the processor to:
retrieve data from a plurality of applications running on a client device, the data comprising data objects generated by the plurality of applications;
extract identifying information about each of the plurality of applications from the data, the identifying information comprising entities associated with the data;
organize, by the processor, the identifying information into a data structure in view of the entities associated with the data;
store, by the processor, the data structure in a searchable repository, wherein the identifying information is located in the data structure by searching the searchable repository for the entities associated with the data;
retrieve stored information from the searchable repository in response to a request from one of the plurality of applications;
generate an interface to present the stored information, the interface comprising a first interface element to present first identifying information from a first record and a second interface element to present second identifying information from a second record; and
provide the interface to the one of the plurality of applications for display on a display device, wherein the second interface element to cascade from the first interface element to present the second identifying information in response to an interaction with the first interface element.

14. The non-transitory computer readable storage medium of claim 13, wherein the plurality of applications comprises at least one of a database application, an electronic mail application, a customer relationship management application, a computer system utility application, a browser application, a multi-media application, a word processing application, or a spreadsheet application.

15. The non-transitory computer readable storage medium of claim 13, wherein the identifying information comprises at least one of a type of application from which the data was retrieved, a subject of the data, a reference to the data, an entity associated with the data, or a person associated with the entity.

16. The non-transitory computer readable storage medium of claim 13, wherein to extract the identifying information, the instructions cause the processor to apply an extraction rule corresponding to a type of application from which the data was retrieved.

17. The non-transitory computer readable storage medium of claim 13, wherein the data structure comprises a hierarchical data structure of entries, each entry comprising a corresponding entity, a stored person related to the corresponding entity, and stored data related to the corresponding entity.

* * * * *